(12) United States Patent
Larsen et al.

(10) Patent No.: US 8,602,568 B2
(45) Date of Patent: Dec. 10, 2013

(54) LOW POWER RETROREFLECTIVE COMMUNICATIONS SYSTEM AND METHOD

(71) Applicant: The Boeing Company, Chicago, IL (US)

(72) Inventors: Ty Aaby Larsen, Everett, WA (US); Henry V. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/827,535

(22) Filed: Mar. 14, 2013

(65) Prior Publication Data

US 2013/0250393 A1    Sep. 26, 2013

Related U.S. Application Data

(62) Division of application No. 12/628,986, filed on Dec. 1, 2009, now Pat. No. 8,425,059.

(51) Int. Cl.
*G02B 5/12* (2006.01)

(52) U.S. Cl.
USPC .......................................................... 359/527

(58) Field of Classification Search
USPC ................. 359/527, 529–530, 534–544, 546; 398/118–131, 140–181
See application file for complete search history.

(56) References Cited

U.S. PATENT DOCUMENTS

| | | | |
|---|---|---|---|
| 5,592,330 A * | 1/1997 | Bernard | 359/529 |
| 6,045,230 A | 4/2000 | Dreyer et al. | |
| 6,154,299 A | 11/2000 | Gilbreath et al. | |
| 6,985,274 B2 | 1/2006 | Kubaink | |
| 7,054,563 B2 | 5/2006 | Tsumura | |
| 7,345,804 B1 | 3/2008 | Sayyah et al. | |
| 7,950,812 B2 | 5/2011 | Roes et al. | |
| 2002/0149721 A1 | 10/2002 | Minoura et al. | |
| 2006/0170633 A1 | 8/2006 | Satoh | |
| 2007/0064296 A1 | 3/2007 | Fathimulla et al. | |
| 2007/0273948 A1 | 11/2007 | Roes et al. | |
| 2009/0010644 A1 | 1/2009 | Varshneya et al. | |
| 2009/0232509 A1 | 9/2009 | Heikenfeld et al. | |
| 2010/0265558 A1 | 10/2010 | Leister et al. | |

FOREIGN PATENT DOCUMENTS

| | | |
|---|---|---|
| DE | 102007063382 | 7/2009 |
| JP | 6265835 | 9/1994 |
| WO | 2005/041450 | 5/2005 |
| WO | 2007/082070 | 7/2007 |
| WO | 2008/017864 | 2/2008 |
| WO | 2010/063984 | 6/2010 |

OTHER PUBLICATIONS

GB, Combined Search and Examination Report, Application No. GB1020380.0 (Mar. 18, 2011).

* cited by examiner

*Primary Examiner* — Jennifer L. Doak
(74) *Attorney, Agent, or Firm* — Dan Brecht (57) ABSTRACT

A system may include a spherical retroreflector that reflects incident light back in substantially the same direction as a light source; and a surface of the spherical retroreflector including a light modulator that modulates incident light from the light source in response to a stimulus and reflects a modulated light, wherein the light modulator is a variably reflecting backing of the spherical retroreflector.

20 Claims, 9 Drawing Sheets

LOW POWER RETROREFLECTIVE COMMUNICATIONS SYSTEM AND METHOD

FIELD

Embodiments of the subject matter described herein relate generally to a system and method for utilizing variable retroreflectors in self-aiming extremely low power communication devices and indications transmitters.

BACKGROUND

Both corner cube retroreflectors and spherical retroreflectors are optical designs that redirect an incoming beam of incident light from a wide range of viewable angles back towards the source of the incident light without the need for moving optics or other assemblies.

Corner cube retroreflectors make use of angled reflecting surfaces to reflect incident light back to the source. Corner cube retroreflectors can have exposed protruding reflective surfaces, such as polished metal or other coated surfaces, or can be internally reflective, for example lenses cut to have an internal corner at one end and a face to receive light at the other end. Incident light that enters the corner cube is reflected between the surfaces such that it exits in the same direction as the light entered.

Spherical retroreflectors utilize beads that are embedded in a reflective material, such that incident light enters the front of the bead, is refracted as it enters the bead, is reflected by the reflective material at the back of the bead, and is again refracted by an equal amount as it exits the bead. In this manner, the incident light is returned in the same directions as the light entered.

U.S. Pat. No. 6,045,230 to Dreyer et al. describes a modulating retroreflective article having a back surface and a front surface separated by a distance. The back surface has alternating retroreflective areas and separation areas and the front surface has alternating areas of different transmission characteristics. The modulating retroreflective article modulates the incident light based on the relative displacement of the back and front surfaces and the angle of the incident light. Physical movement of the article or changes in the angle of incident light modulates the light and therefore can be used to transmit information. However the system is not adapted to a communications system. Moreover, a system that requires physical movement limits the data rate at which information can be transmitted, both because physical systems have limits as to how quickly they can be moved to cause the modulation, and because there is a limit as to how accurately the physical changes can be transformed into detectable modulations. Moreover, systems that rely upon physically moving elements are susceptible to system noise such as vibration and other perturbations of physical systems. The use of a physically spaced plate in front of the retroreflector also reduces viewable area of the reflector component, while imposing a reduced effective operating angle for the entire assembly as light will be blocked or interfered with by the front mask as incident angle increases.

SUMMARY

In one embodiment, a system may include a spherical retroreflector that reflects incident light back in substantially the same direction as a light source; and a surface of the spherical retroreflector may include a light modulator that modulates incident light from the light source in response to a stimulus and reflects a modulated light, wherein the light modulator is a variably reflecting backing of the spherical retroreflector.

In another embodiment, a system may include a corner cube retroreflector that reflects incident light back in substantially the same direction as a light source; and a light modulator including a substrate, a first electrically conductive layer on the substrate, a plurality of photonic crystal beads in electrical communication with the first electrically conductive layer, wherein the plurality of photonic crystal beads are formed in a corner cube retroreflective pattern.

In yet another embodiment, a system may include a first electrically conductive layer; a layer of a plurality of photonic crystal beads in electrical communication with the first electrically conductive layer; a fill conductive layer; and a plurality of retroreflective spherical beads embedded into the layer of photonic crystal beads, whereby the fill conductive layer coats the layer of photonic crystal beads to provide an electrically conductive path for energizing the layer of the plurality of photonic crystal beads, and whereby the photonic crystal beads modulate the reflectivity of the retroreflective spherical beads.

In still another embodiment, a system may include a plurality of photonic crystal beads; and a plurality of retroreflective spherical beads in one of electrical and optical communication with the plurality of photonic crystal beads, wherein the photonic crystal beads modulate a reflectivity of the plurality of retroreflective spherical beads in response to a stimulus.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the low-power retroreflective communication device system and method. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

System Components

Figure 1A:
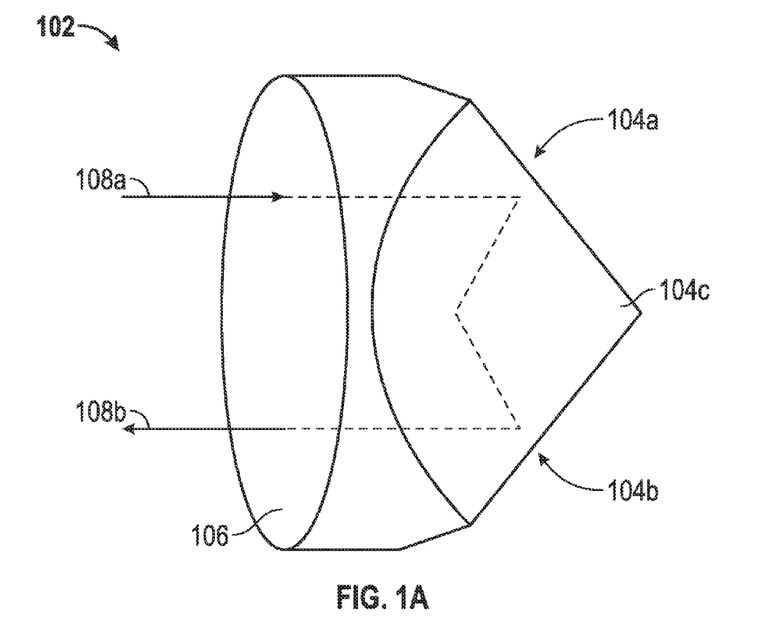
FIG. 1A is a diagram of a corner cube retroreflector utilizing orthogonally protruding mirrored surfaces in one embodiment of a low-power retroreflective communication system.

Referring now to FIG. 1A, an internally reflecting corner cube retroreflector 102 made of a clear lens material has been cut to have an internal corner with reflecting surfaces 104a, 104b, and 104c at one end and a face 106 that receives incident light 108a, which may be from a remote system (not shown), at the other end. Incident light 108a that enters the corner cube is reflected between the reflecting surfaces 104a, 104b, 104c such that the incident light 108a exits the face 106 in the same direction 108b as the light entered the face 106.

Figure 1B:
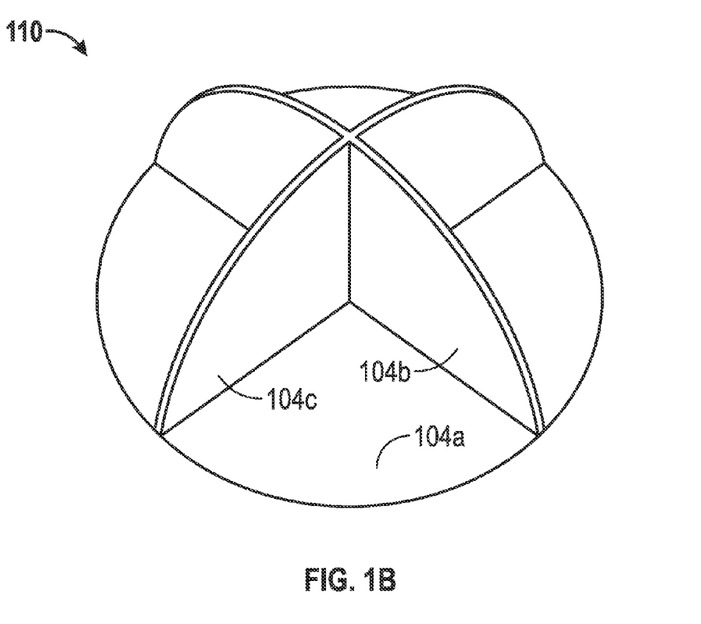
FIG. 1B is a diagram of a corner cube retroreflector utilizing internal orthogonal mirrored surfaces in one embodiment of a low-power retroreflective communication system.

FIG. 1B is a corner cube retroreflector 110 that includes multiple protruding reflecting surfaces 104a, 104b, 104c that are orthogonally angled to one another and reflect incident light 108a back in the direction 108b of the source of the light.

Figure 1C:
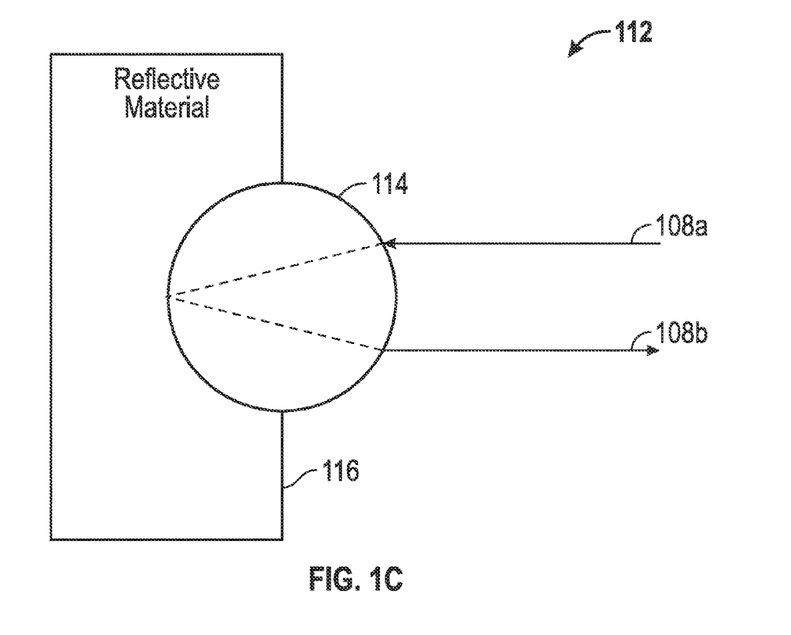
FIG. 1C is a diagram of a spherical retroreflector with a reflective backing in one embodiment of a low-power retroreflective communication system.

FIG. 1C is a spherical retroreflector 112 with a spherical bead 114 that receives the incident light 108a, a reflective backing 116 that reflects the incident light 108a back in the direction 108b of the source of the light. The term light is used throughout this disclosure for convenience only and is intended to include any frequency of electromagnetic radiation, both in the visible frequencies and above or below the visible frequencies of light, except where visible frequencies of light are specifically referred to in the disclosure. As one of ordinary skill in the art would appreciate, the aspects of the present disclosure could be applied to infrared light, radio frequency radiation, radar applications, etc.

Figure 2A:
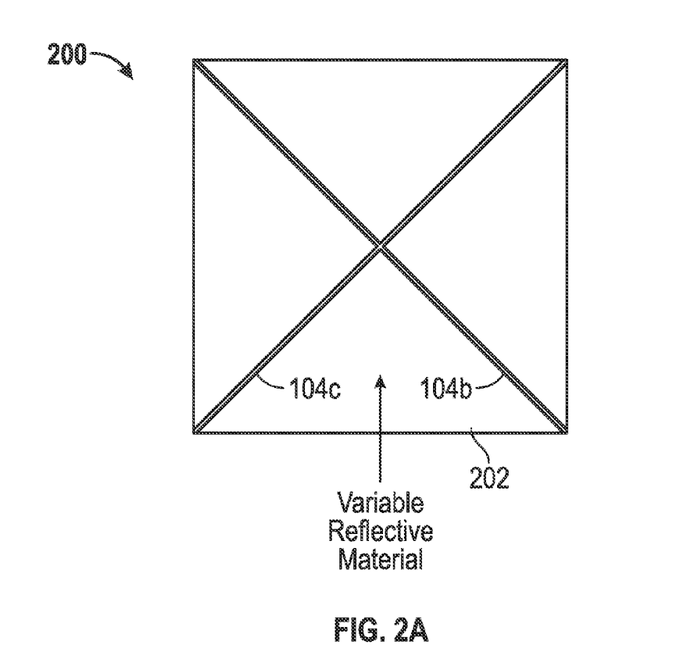
FIG. 2A is a diagram of a corner cube retroreflector utilizing orthogonally protruding surfaces and variably reflective material in one embodiment of a low-power retroreflective communication system.

Referring now to FIG. 2A, an embodiment of a variably reflective corner cube retroreflector 200 utilizing orthogonally protruding surfaces and a variably reflective backing is presented. The variably reflective corner cube retroreflector 200 is similar to the corner cube retroreflector 110 of FIG. 1B, except that one or more of the reflective surfaces 104a, 104b, 104c is replaced with a variably reflective surface 202. In an embodiment shown in FIG. 2B, the variably reflective surface 202 is a thin film photonic crystal 204 that may act as a light modulator that modulates the incident light 108a from the light source. In an embodiment, the thin film photonic crystal 204 is comprised of a glass or plastic substrate 206, a first electrically conductive layer 208, for example a layer of indium tin oxide (ITO) or metal, on the substrate; a photonic crystal layer 210 in electrical communication with the electrically conductive layer 208; an optically transparent, electrically conductive layer 212, for example a layer of ITO, in electrical communication with the photonic crystal layer 210; and a protective layer 214, for example a layer of glass or plastic. Incident light 108a from the remote source penetrates the protective layer 214 and optically transparent, electrically conductive layer 212, and hits the photonic crystal layer 210. The reflectance of the photonic crystal layer 210 is modulated in response to a stimulus, which in an embodiment is varying the voltage across the conductive layers 208, 212 by a modulation source 216. The photonic crystal layer 210 is selectively tunable to specific wavelengths of light. Current generation thin film photonic crystal 204 requires extremely small amounts of power, for example a few microamps at approximately 3 volts.

To use variably reflective corner cube retroreflector 200 as a communications device, the reflectance of the photonic crystal layer 210 is transitioned from a reflective state for a particular wavelength of incident light 108a, to a non-reflective state, thus effecting an on/off binary communications modes. Coding of the on/off states into a standard or non-standard serial bit stream is well known in the art. In other embodiments, the photonic crystal layer 210 is transitioned into multiple states of reflectance, partial reflectance, and non-reflectance to increase the effective amount of information per transition. In embodiments, the incident light 108a is monochromatic. In embodiments, the incident light 108a is white light, and the full operating band of the thin film photonic crystal 204 is utilized to modulate the white light into colored light by reflecting or absorbing different wavelengths of the white light. In one embodiment, a color-capable CCD or Charge Coupled Device camera is positioned near the light source to detect the color of the variably reflective corner cube retroreflector 200. In embodiments, an array of variable retroreflectors operate in unison to increase the amount of information returned via modulated light.

In an embodiment, the low-power retroreflective communication device 200 may utilize incoming electromagnetic radiation 108a of a remote system (not shown), for example an interrogation system, for communicating information back to the interrogation system. The interrogation system may send electromagnetic radiation, for example continuous light, toward the low-power retroreflective communications device 200, which modulates and reflects the incident light, and returns this modulated light back in the direction of the remote system, which may be an interrogation system, as a communications signal that, in an embodiment, may include a coded data transmission.

Photonic crystals are easy to manufacture, have low current requirements, can operate as bi-stable materials, meaning that once in an on or off state, little to no power is required to maintain that on or off state, and are easily scalable for small or large designs. Photonic crystals can also be considered multi-stable with the ability of being transitioned across a large gamut of reflective states, and then holding their set state upon removal of power. In an embodiment, the voltage applied to the variably reflective corner cube retroreflector 200 is based on the value of a sensor, for example a sensor to detect local temperature. The ultra-low current and voltage operation and lack of any need for specialized tracking optics or high powered interrogation sources makes the variably reflective corner cube retroreflector 200 attractive for low cost "disposable" sensor systems, energy harvesting devices, and "peel-and-stick" style sensing systems.

Figure 2B:
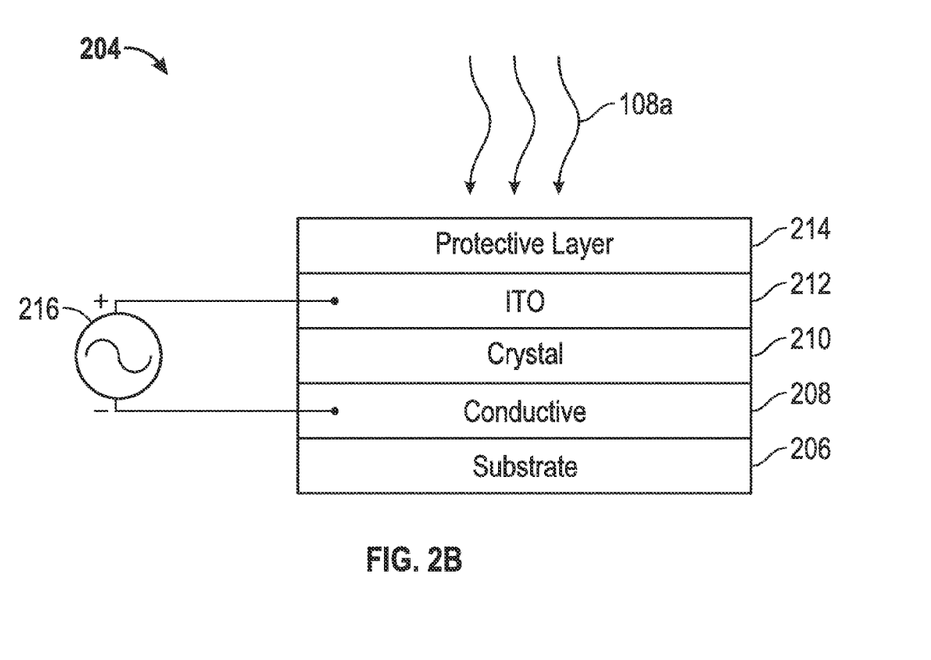
FIG. 2B is a diagram of the layers of a variably reflective material in one embodiment of a low-power retroreflective communication system.
Figure 2C:
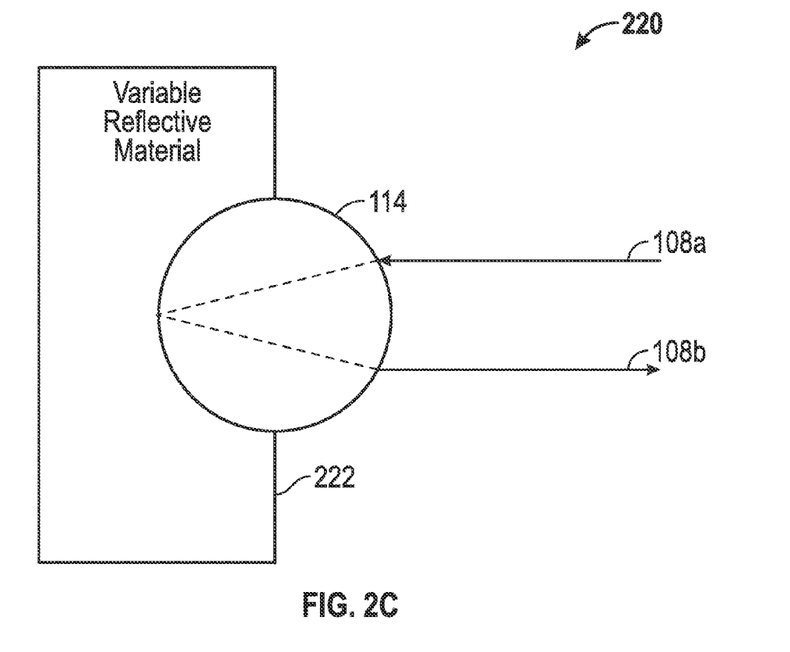
FIG. 2C is a diagram of a spherical retroreflector with a variably reflective backing in one embodiment of a low-power retroreflective communication system.

FIG. 2C is a diagram of a variably reflective spherical retroreflector 220 with a light modulator in the form of a variably reflective backing 222. Incident light 108a enters the spherical bead 114, and is variably reflected back in the direction 108b of the source of the light. In embodiments, the variably reflective backing 222 is comprised of a thin film photonic crystal 204 (FIG. 2B). The variably reflective spherical retroreflector 220 operates similarly to the variably reflective corner cube retroreflector 200.

Operation

Using retroreflective elements allows a low-power retroreflective communication device to be self-aiming, thereby reducing the need for power or time to correctly aim the communications device. In embodiments, the low-power retroreflective communication device is passive, in that it does not generate the electromagnetic radiation used to communicate with another remote system. Generating electromagnetic radiation to communicate with another remote system can require significant amounts of power dependant on range and application. A communications device that generates electromagnetic radiation not only requires a power source, such as a battery, solar cell, or fuel cell, but also power conditioning circuitry to regulate the power to a desired voltage, current, or power, and an oscillator to generate the desired frequency of electromagnetic radiation for transmission and communication with the remote system.

The power conditioning circuitry, and circuitry associated with the oscillator and modulator all consume power from the battery, solar cell, or fuel cell, some of which is wasted as heat. A system that generates its own electromagnetic radiation therefore requires relatively large batteries, solar cells, or fuel cells. By relatively large, it is meant that the batteries, solar cells, or fuel cells are relative large compared with the circuitry, which can be extremely small using solid state and mix-mode fabrication methods. In such systems, power is also continuously used as the system must constantly expend power to share its status, which also creates the need for ever larger energy storage methods. Eliminating the need to generate the electromagnetic radiation by the communications device reduces the amount of power needed. In embodiments, the low-power retroreflective communication device only requires power for the modulator circuit that modulates the oscillation in order to communicate telemetry information or a coded data transmission to a remote system is all that is necessary, allowing the use of smaller power sources.

In other embodiments, such as for sensor applications, the sensor is the modulator for the low-power retroreflective communication device, eliminating the need to incorporate a power source in the design of the communications device. Smaller power sources make the low-power retroreflective communication device attractive for applications where size, weight, and battery life are important considerations, for example in spacecraft. In other embodiments, the electromagnetic energy, such as light, used to interrogate the sensor may also be used to provide power to the sensor, thereby further reducing or eliminating the need for any power storage devices at all.

Additionally, since the low-power retroreflective communication device is passive in terms of emitting electromagnetic radiation, it allows for stealthy communications with military vehicles and personnel, making it difficult or impossible for adversaries to detect the vehicles or personnel by monitoring for sources of electromagnetic radiation. In this passive embodiment, the communications device does not emit electromagnetic radiation of its own and only reflects modulated electromagnetic radiation in a very directional manner back to the source of the incident electromagnetic radiation, making detection or interception of communications unlikely. This feature makes the low-power retroreflective communication device attractive for applications such as IFF receivers, or identify friend-foe receivers, worn by soldiers on the battlefield who wish to remain concealed from the enemy but identifiable by friendly forces.

Embodiments and Applications

Figure 3A:
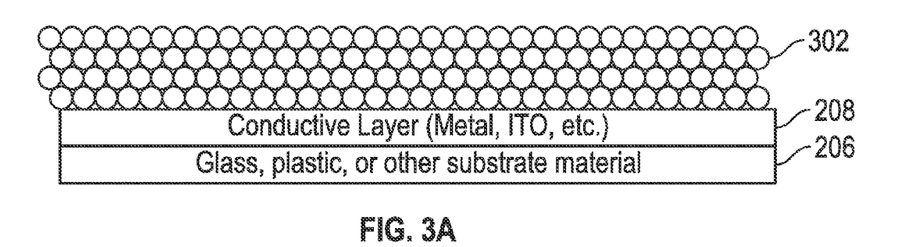
FIGS. 3A, 3B and 3C illustrate a process of creating a plurality of corner cube-based retro reflectors with variably reflective photonic crystals in one embodiment of a low-power retroreflective communication system.
Figure 3B:
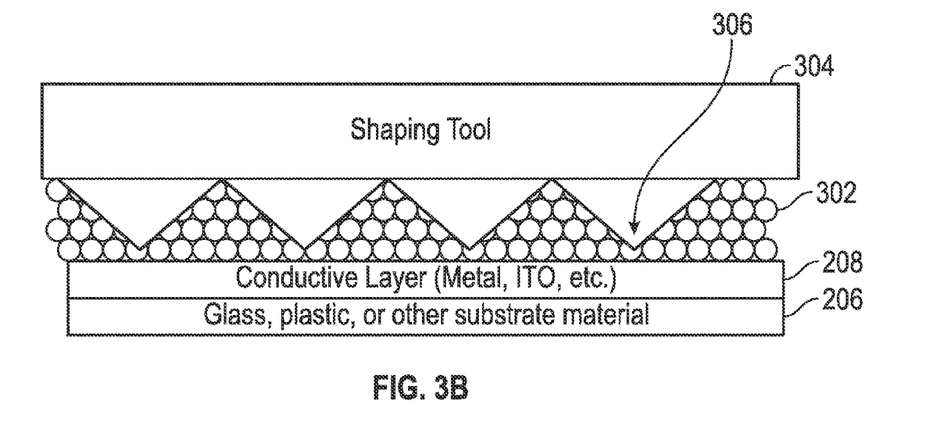
Figure 3C:
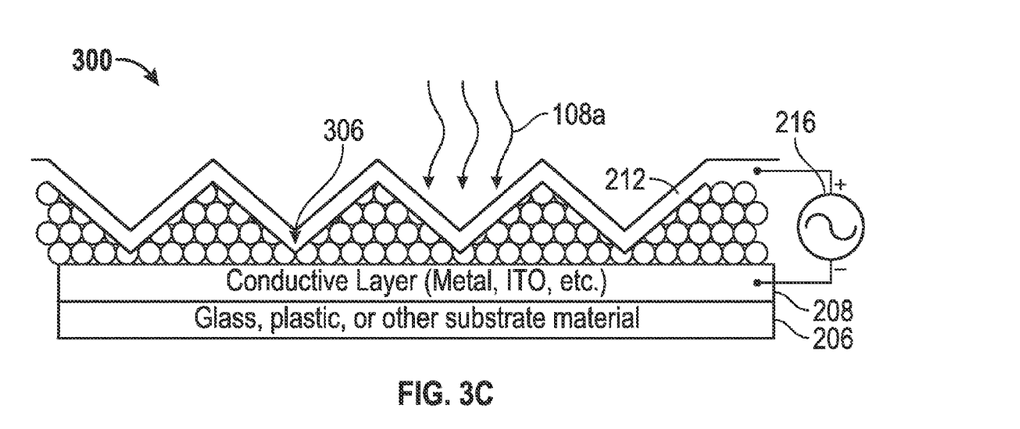

Referring now to FIGS. 3A, 3B, and 3C, an embodiment and method of manufacturing of a variably reflective internal corner cube retroreflector 300 is illustrated. Referring now to FIG. 3A, a glass or plastic substrate 206 has a first electrically conductive layer 208, for example a metal or ITO layer, on it, and a plurality of photonic crystal beads 302 in electrical communication with the first electrically conductive layer. Photonic crystal beads 302 are used instead of a solid crystal as they facilitate manufacturing of the corner cubes 306 shown in FIG. 3B. Referring now to FIG. 3B, a shaping tool 304 is pushed into the photonic crystal beads 302 to form corner cube retroreflective patterns 306 that face up towards the incident light 108a as shown in FIG. 3C. In FIG. 3C, the shaping tool 304 is removed and a second, optically transparent, electrically conductive layer 212 is coated on the plurality of photonic crystal beads 302 and is in electrical communication with the plurality of photonic crystal beads, to both retain the shape of the corner cube retroreflective patterns 306 and provide an electrical path to the plurality of photonic crystal beads 302 by the modulation source 216. The variably reflective internal corner cube retroreflector 300 operates similarly to the variably reflective corner cube retroreflector 200. In an embodiment, the shaping tool 304 is also a lens element with conductive properties and is not removed from the photonic crystal beads 302. In an embodiment, the shaping tool 304 or a coating on the shaping tool 304 is used as the electrical path to the photonic crystal beads 302 by the modulation source 216.

Figure 4A:
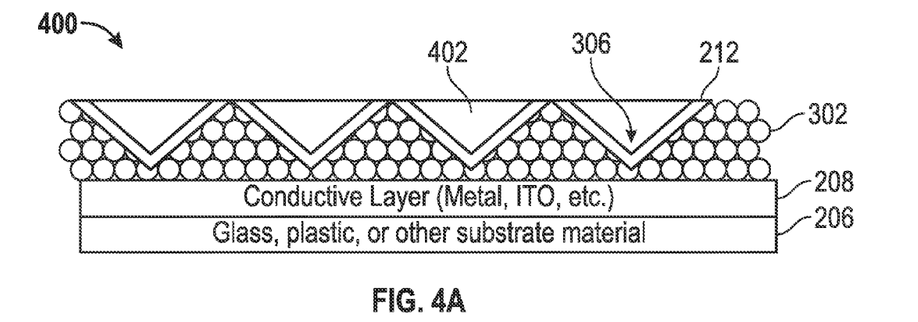
FIG. 4A is an embodiment of a corner cube-based retro reflectors with variably reflective photonic crystals with an embedded shaping element in one embodiment of a low-power retroreflective communication system.

FIG. 4A illustrates an embodiment of a flat, variably reflective internal corner cube retroreflector 400 where an optical element 402, coated with a optically transparent, electrically conductive layer 212, is positioned on the photonic crystal beads 302 of the variably reflective internal corner cube retroreflector 300 of FIG. 3C. Having a flat optical element 402 on top and a flat bottom substrate 206 facilitates with roll-to-roll fabrication of the variably reflective internal corner cube retroreflector 400.

Figure 4B:
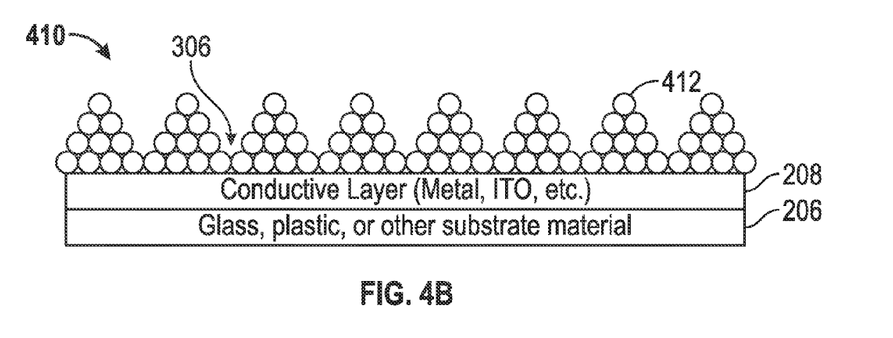
FIG. 4B is an embodiment of a corner cube-based retro reflectors with deposited variably reflective photonic crystals in one embodiment of a low-power retroreflective communication system.

FIG. 4B illustrates an embodiment of a deposited and/or etched variably reflective internal corner cube retroreflector system 410 where deposited photonic crystal beads 412 are shaped substantially into a corner cube retroreflective pattern 306 directly, such that light incident on the system from a source is reflected substantially back in a direction approximating the source. In embodiments, the deposited photonic crystals are beads deposited by an ink jet type processing, beads placed by small scaled positioning techniques such as electrostatic methods known in the art, chemical etching, mechanical etching, low pressure vapor deposition, or combinations thereof. The optically transparent, electrically conductive layer 212 is not shown in FIG. 4B, but may be deposited using similar or conventional techniques.

Figure 5:
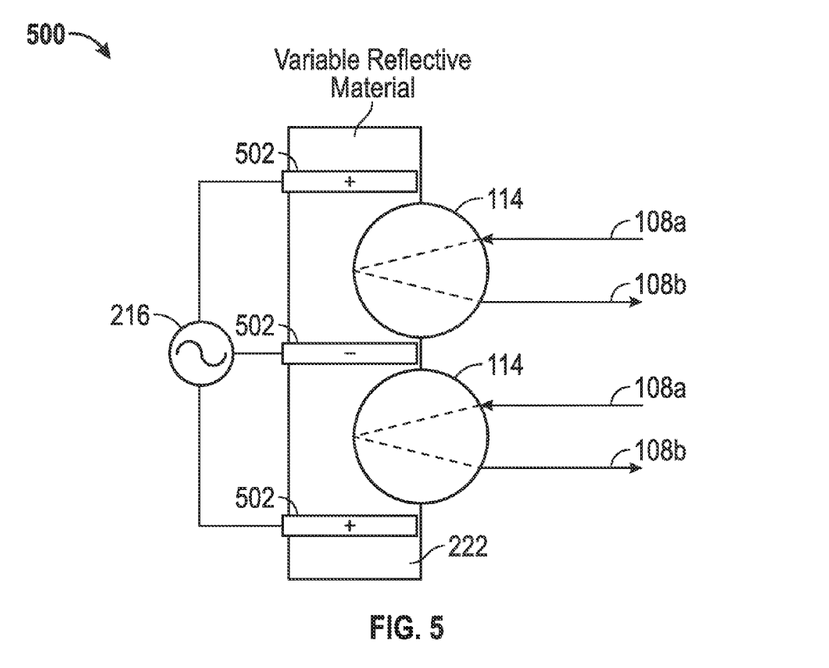
FIG. 5 is a diagram of a plurality of spherical retro reflectors with variably reflective backing in one embodiment of a low-power retroreflective communication system.

FIG. 5 illustrates a peg-grid variably reflective spherical retroreflector 500 similar to the variably reflective spherical retroreflector 220 of FIG. 2C. The peg-grid variably reflective spherical retroreflector 500 comprises a grid of pegs 502 to apply voltage across the thin film photonic crystal 204 (FIG. 2B) of the variably reflective backing 222. In an embodiment, the modulation source 216 applies voltages to the pegs 502 of the variably reflective backing 222 to modulate the transparency of the thin film photonic crystal 204. In embodiments, one or more modulation sources 216 modulate voltages to the pegs 502 of the variably reflective backing 222 to create patterns of reflectivity.

Figure 6:
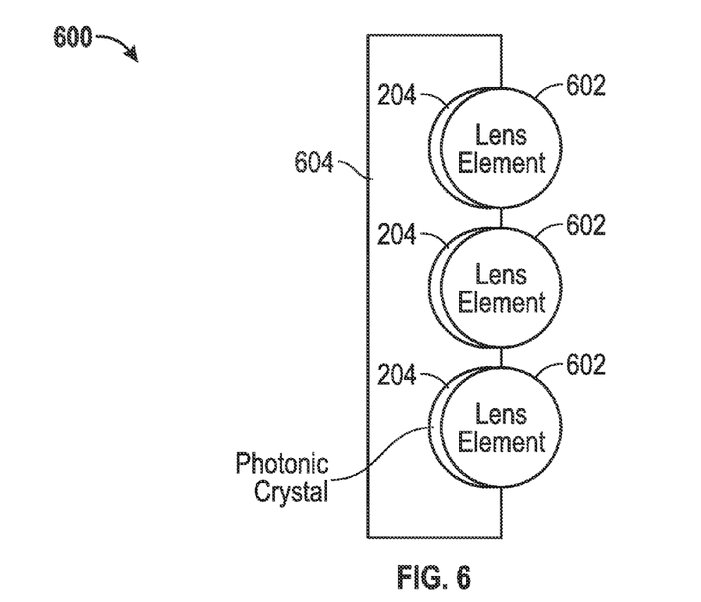
FIG. 6 is a diagram of a plurality of spherical retro reflectors with thin layer variably reflective photonic crystal coatings in one embodiment of a low-power retroreflective communication system.

FIG. 6 illustrates a deposited bead variably reflective spherical retroreflector 600 similar to the variably reflective spherical retroreflector 220 of FIG. 2C. In this embodiment, a thin film photonic crystal 204 is deposited onto a portion of lens elements, which may be in the form of deposited beads 602. The deposited beads 602 are positioned in a conductive backing 604 with the portion of the thin film photonic crystal 204 contacting the conductive backing 604, which provides an electrically conductive path to the modulation source (not shown).

Figure 7:
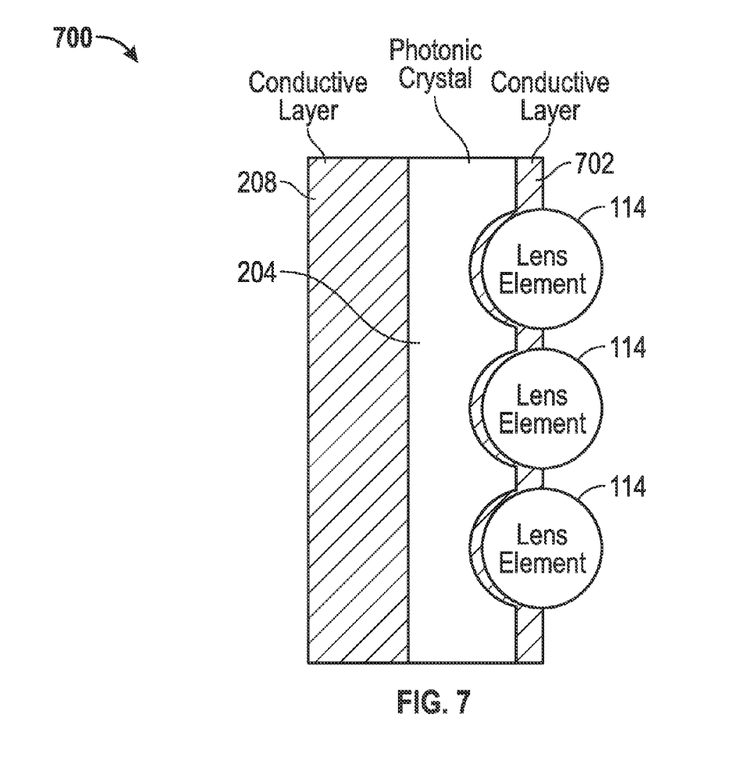
FIG. 7 is a diagram of a plurality of spherical retro reflectors with a variably reflective photonic crystal layer between conductive layers in one embodiment of a low-power retroreflective communication system.

FIG. 7 illustrates a patterned photonic crystal variably reflective spherical retroreflector 700 comprising a first electrically conductive layer 208, a thin film photonic crystal 204, and a patterned electrically conductive layer 702. Lens elements in the form of spherical beads 114 fit into the patterned conducting layer 702. As shown, both the thin film photonic crystal 204 and the patterned conducting layer 702 have indents for accepting the spherical beads 114. In embodiments, any combination of the conducting layer 208, the thin film photonic crystal 204, the patterned conducting layer 702, or a protective layer (not shown) can be indented. In an embodiment, to facilitate manufacturing of the patterned photonic crystal variably reflective spherical retroreflector 700, the conducting layer 208, the thin film photonic crystal 204, and the patterned conducting layer 702 are manufactured first and then the spherical beads 114 spread over the indents and allowed to settle into the indents.

Figure 8:
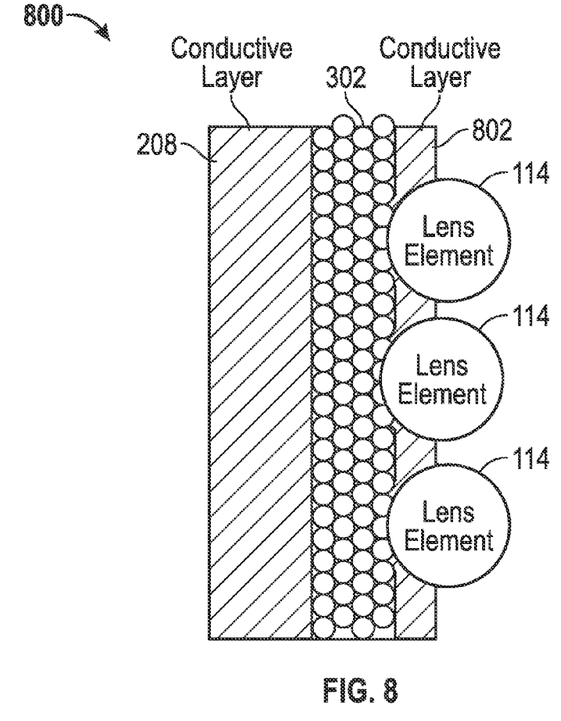
FIG. 8 is a diagram of a plurality of spherical retro reflectors with beads of variably reflective photonic crystals between conductive layers in one embodiment of a low-power retroreflective communication system.

FIG. 8 illustrates a bead photonic crystal variably reflective spherical retroreflector 800 comprising a first electrically conductive layer 208, a layer of a plurality of photonic crystal beads 302 in electrical communication with the first electrically conductive layer, and a fill conductive layer 802. Lens elements in the form of a plurality of retroreflective spherical beads 114 are embedded into the layer of a plurality of photonic crystal beads 302, and the fill conductive layer 802 coats the layer of photonic crystal beads 302 to provide the electrically conductive path for energizing the layer of the plurality of photonic crystal beads 302. The photonic crystal beads 302 modulate the reflectivity of the retroreflective spherical beads 114 in response to a stimulus. In an embodiment, the retroreflective spherical beads 114 are pre-coated with an electrically conductive material such as ITO or comprised of ITO to provide a better electrically conductive path for energizing the layer of photonic crystal beads 302. In an embodiment, to facilitate manufacturing of the bead photonic crystal variably reflective spherical retroreflector 800, the retroreflective spherical beads 114, and the fill conducting layer 802 are mixed with conductive components and applied together as a coating to the layer of photonic crystal beads 302.

Figure 9A:
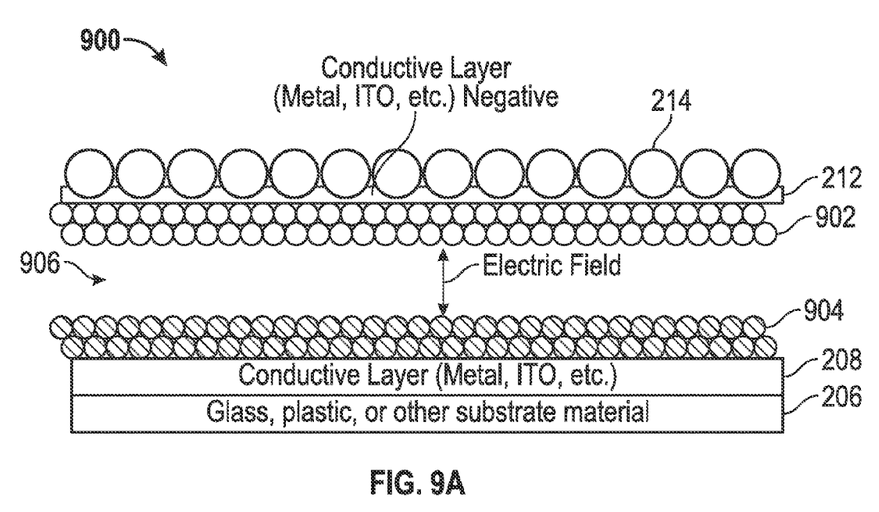
FIG. 9A is a diagram a bi-static display in one embodiment of a low-power retroreflective communication system.

FIG. 9A illustrates a bi-static cell 900 for implementing a spherical variable retroreflective design. The bi-static cell 900 is comprised of a glass or plastic substrate 206, a first electrically conductive layer 208 on the substrate, a liquid medium 906 filled with bi-static display beads in the form of a plurality of substantially reflective beads in the form of white polystyrene beads 902 and a plurality of substantially light-absorbing beads in the form of black polystyrene beads 904, a second optically transparent, electrically conductive layer 212, and a protective coating 214. The white polystyrene beads 902 and black polystyrene beads 904 have different electrical charge properties such that when an electric field is applied between the conducting layer 208 and the transparent conducting layer 212, the white polystyrene beads 902 and black polystyrene beads 904 will migrate to opposite sides of the liquid medium 906. The bi-static cell 900 is grouped with other individual cells that can make pixels for a display (not shown.)

Figure 9B:
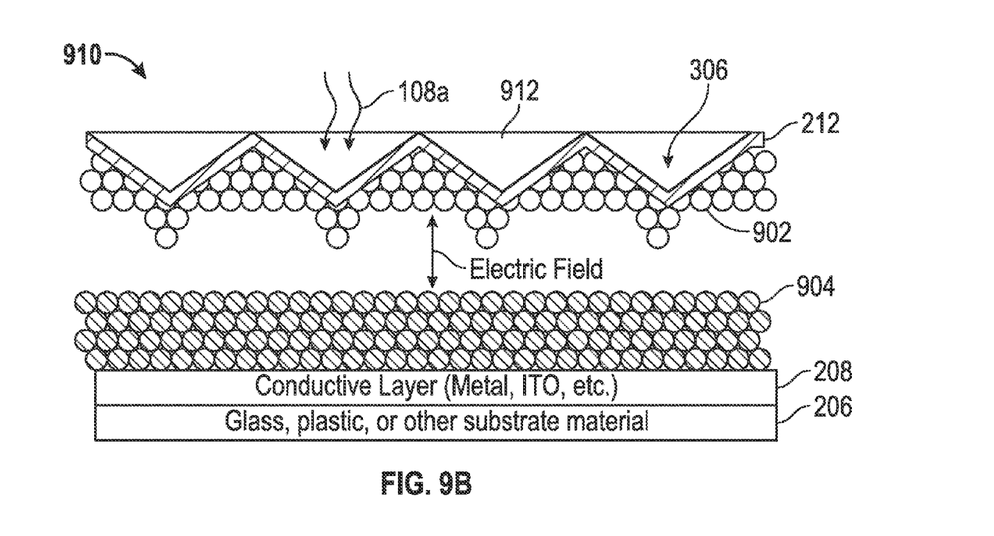
FIG. 9B is a diagram of a modified bi-static display technique with a plurality of corner cube retro reflectors in one embodiment of a low-power retroreflective communication system.

Referring now to FIG. 9B, a retroreflective bi-static cell 910 for variably reflective faceted retroreflectors is presented. The retroreflective bi-static cell 910 is similar to the bi-static cell 900 of FIG. 9A, but instead includes a corner cube optical element 912 similar to the optical element 402 of FIG. 4A. The corner cube optical element 912 is coated with a transparent conducting layer 212, comprising for example ITO, that sets up the electric field in the liquid medium 906 with the conducting layer 208. In an embodiment, the retroreflective bi-static cell 910 further differs from the bi-static cell 900 of FIG. 9A in that the retroreflective bi-static cell 910 uses more bi-static display beads in the form of more white polystyrene beads 902 and more black polystyrene beads 904 than the bi-static cell 900. The additional white polystyrene beads 902 and black polystyrene beads 904 are used to better cover the peaks of the corner cubes 306 of the corner cube optical element 912 that project into the fluid medium 906.

Figure 10A:
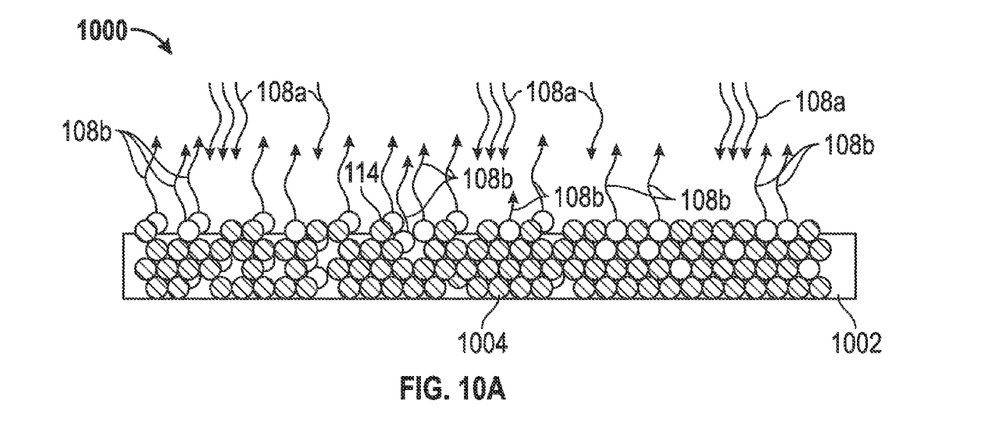
FIG. 10A is a diagram of spherical retro reflectors with variably reflective photonic crystals in a transparent binder in one embodiment of a low-power retroreflective communication system.

Referring now to FIG. 10A, a retroreflective optical sensor 1000 is presented. The retroreflective optical sensor 1000 comprises a plurality of retroreflective spherical beads 114, and a light modulator in the form of a plurality of sensing photonic crystal beads 1004, mixed together in a transparent binder 1002. In embodiments, the transparent binder 1002 is a paint that is applied to a surface, for example by spraying it on the surface. The transparent binder 1002 binds to the plurality of retroreflective spherical beads 114 and to the plurality of sensing photonic crystal beads 1004 such that at least a portion of the retroreflective spherical beads and a portion of the sensing photonic crystal beads are in optical communication with each other. The sensing photonic crystal beads 1004 modify the incident light 108*a*, while the retroreflective spherical beads 114 retro-reflect the incident light back to the source of the light, as indicated at 108*b*. In embodiments, the sensing photonic crystal beads 1004 modulate the reflectivity of the plurality of retroreflective spherical beads 114 in response to a stimulus. In embodiments, the stimulus is an electrical stimulus, an electrostatic stimulus, a magnetic stimulus, an electromagnetic stimulus, an optical stimulus, a pressure stimulus, a temperature stimulus, a biological stimulus, and a chemical stimulus. In embodiments, the stimuli directly affect the orientation of elements in the sensing photonic crystal beads 1004, thereby modulating the reflectance. The sensing photonic crystal beads 1004 of the retroreflective optical sensor 1000 directly convert a stimulus into a detectable change in the incident light, thereby eliminating the need for a separate power source and separate electrical conduction path to the sensing photonic crystal beads 1004.

The retroreflective optical sensor 1000 can be directly applied to an object, or applied to a substrate such as a tape or other flexible substrate. For example, if the sensing photonic crystal beads 1004 modulate the incident light 108*a* in the visible range based on temperature, the retroreflective optical sensor 1000 can be applied to a person or object of interest and using a directed beam of white light, for example a flashlight, the temperature or temperature gradients can be directly observed. This could be useful as a diagnostic tool for doctors and their patients or as a safety tool for firefighters wanting to gauge the temperature of a door, ceiling, or floor for indications of fire. If the sensing photonic crystal beads 1004 modulate the incident light 108*a* based on pressure, the retroreflective optical sensor 1000 can be applied to objects of interest such as mechanical structures or airplane wings to gauge static or dynamic stresses or areas of damage or cracking. If the sensing photonic crystal beads 1004 modulate the incident light 108*a* as a result of the presence of a chemical, for example water, the retroreflective optical sensor 1000 can be applied to a paint for example to enhance visibility of road lines during rainy weather or visibly indicate other slick conditions due to oil or other chemical components on the road. Similarly, if sensing photonic crystal beads 1004 modulate the incident light 108*a* as a result of the presence or absence of other light, the retroreflective optical sensor 1000 can be applied to a paint for example to enhance visibility of road lines during daylight hours, but reduce the retro-reflectivity or shift spectrum during nighttime to prevent blinding or overpowering drivers with reflected light.

Figure 10B:
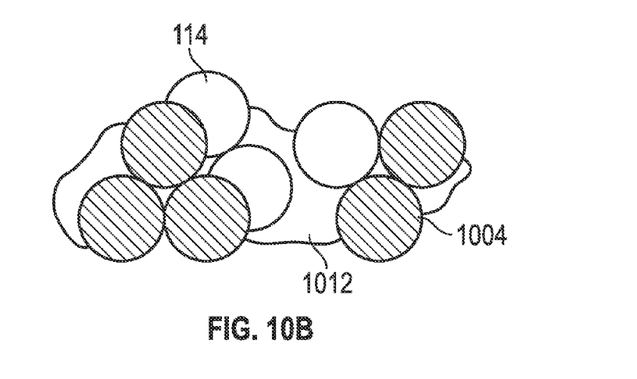
FIG. 10B is a diagram of clusters of spherical retro reflectors with variably reflective photonic crystals for use in a colloidal suspension in one embodiment of a low-power retroreflective communication system.

Referring to FIG. 10B, a retroreflective optical sensor dust 1010 is presented. The retroreflective optical sensor dust 1010 is similar to the retroreflective optical sensor 1000 of FIG. 10A but comprises combining a plurality of sensing photonic crystal beads 1004 and a plurality of spherical beads 114 together and affixing them to one another using transparent binder 1000. The retroreflective optical sensor dust 1010 can be dispersed into the air or into a liquid as a colloidal suspension to provide measurements of air temperature or fluid dynamics.

Figure 11A:
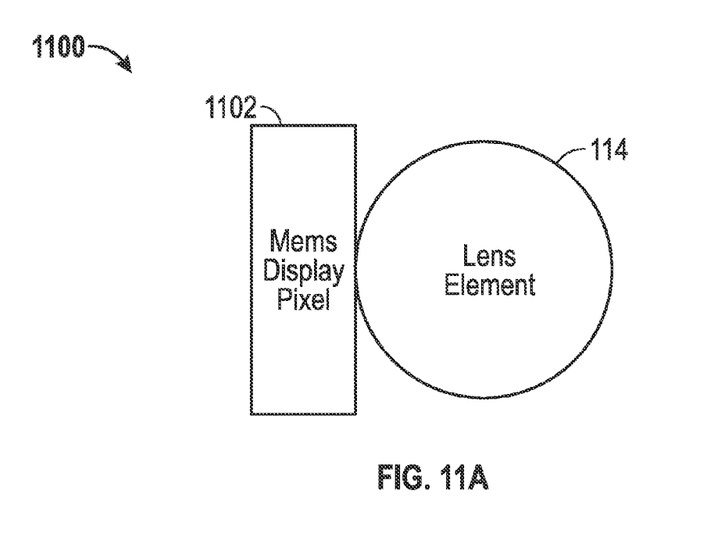
FIG. 11A is a diagram of aspherical retro reflector and MEMS display pixel in one embodiment of a low-power retroreflective communication system.
Figure 11B:
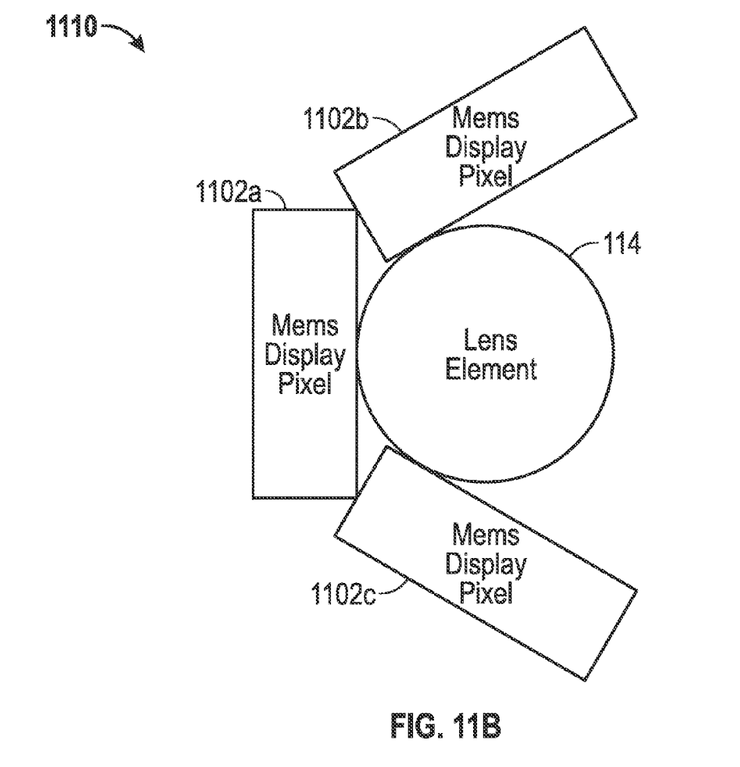
FIG. 11B is a diagram of a spherical retro reflector and a plurality of MEMS display pixels in one embodiment of a low-power retroreflective communication system.

Referring to FIGS. 11A and 11B, a retroreflective display pixel 1100 and a multi-angle retroreflective display pixel 1110 are presented. The retroreflective display pixel 1100 reflects light back towards a light source based upon the color presented on the MEMS display pixel 1102. A display made up of an array of retroreflective display pixels 1100 would direct light back principally to a viewer who is illuminating the display. This would allow highly directional viewing of a computer display or television display and prevent others from viewing the display, either for reasons of privacy or courtesy. Moreover, because the majority of the light emitted is directed towards the viewer and not dispersed across a wide viewing angle, a display utilizing retroreflective display pixels 1100 would be brighter and have a greater range of contrast. Further, because less overall energy would be constantly directed at each MEMS display pixel 1102 element, the usable life span of the MEMS display pixel 1102 elements would be greatly increased.

Referring now to FIG. 11B, a display made up multi-angle retroreflective display pixels 1110 would allow different programming to be concurrently viewed by different people, or allow different displays to be presented to the left and right eyes of a single viewer, thus aiding in stereo or 3D viewing of programming on the display.

The embodiments of the invention shown in the drawings and described above are exemplary of numerous embodiments that may be made within the scope of the appended claims. It is contemplated that numerous other configurations of the low-power retroreflective communication system and method may be created taking advantage of the disclosed approach. It is the applicant's intention that the scope of the patent issuing herefrom will be limited only by the scope of the appended claims.

What is claimed is:

1. A system, comprising:
    a spherical retroreflector that reflects incident light back in substantially the same direction as a light source; and
    a surface of the spherical retroreflector including a light modulator that modulates incident light from the light source in response to a stimulus and reflects a modulated light, wherein the light modulator is a variably reflecting backing of the spherical retroreflector.

2. The system of claim 1, wherein the retroreflector is a corner cube retroreflector and the light modulator is an orthogonal reflecting surface of the corner cube retroreflector.

3. The system of claim 1, wherein the retroreflector is an internally reflecting corner cube retroreflector.

4. The system of claim 1, wherein the retroreflector is a plurality of retroreflective spherical beads and wherein the light modulator includes a plurality of sensing photonic crystal beads, the system further comprising:
    a transparent binder that binds to the plurality of retroreflective spherical beads to the plurality of sensing photonic crystal beads such that at least a portion of the retroreflective spherical beads and a portion of the sensing photonic crystal beads are in optical communication with each other.

5. The system of claim 1, wherein the incident light is from a remote system and the light modulator modulates the incident light to communicate a coded data transmission to the remote system.

6. The system of claim 1, wherein the stimulus is selected from the group consisting of an electrical stimulus, an electrostatic stimulus, a magnetic stimulus, an electromagnetic stimulus, an optical stimulus, a pressure stimulus, a temperature stimulus, a biological stimulus, and a chemical stimulus.

7. A system comprising:
    a corner cube retroreflector that reflects incident light back in substantially the same direction as a light source; and
    a light modulator including
        a substrate;
        a first electrically conductive layer on the substrate;
        a plurality of photonic crystal beads in electrical communication with the first electrically conductive layer, wherein the plurality of photonic crystal beads are formed in a corner cube retroreflective pattern.

8. The system of claim 7, further comprising a second, optically transparent, electrically conductive layer coated on the plurality of photonic crystal beads and in electrical communication with the plurality of photonic crystal beads.

9. The system of claim 8, further comprising a flat optical element coated with the second, optically transparent, electrically conductive layer and positioned on the plurality of photonic crystal beads.

10. The system of claim 8, further comprising a modulation source in electrical communication with the plurality of photonic crystal beads.

11. The system of claim 7, wherein the plurality of photonic crystal beads are shaped into a corner cube retroreflective pattern, such that light incident on the system from a source is reflected substantially back in a direction approximating the source.

12. The system of claim 11, wherein the photonic crystal beads are deposited into the corner cube retroreflective pattern by a technique selected from the group consisting of ink-jet layering, small scale positioning techniques, electrostatic positioning, chemical etching, mechanical etching, and low pressure vapor deposition.

13. A system comprising:
a first electrically conductive layer;
a layer of a plurality of photonic crystal beads in electrical communication with the first electrically conductive layer;
a fill conductive layer; and
a plurality of retroreflective spherical beads embedded into the layer of photonic crystal beads, whereby the fill conductive layer coats the layer of photonic crystal beads to provide an electrically conductive path for energizing the layer of the plurality of photonic crystal beads, and whereby the photonic crystal beads modulate the reflectivity of the retroreflective spherical beads.

14. The system of claim 13, wherein the retroreflective spherical beads are pre-coated with an electrically conductive material.

15. A system comprising:
a plurality of photonic crystal beads; and
a plurality of retroreflective spherical beads in one of electrical and optical communication with the plurality of photonic crystal beads,
wherein the photonic crystal beads modulate a reflectivity of the plurality of retroreflective spherical beads in response to a stimulus.

16. The system of claim 15, wherein an incident light from a remote system is modulated by the photonic crystal beads to produce a coded data transmission for communication back to the remote system as a modulated light, and wherein the plurality of retroreflective spherical beads directs the modulated light substantially back in a direction of the remote system.

17. The system of claim 15, wherein an incident light on the system is modulated by the photonic crystal beads to produce a modulated light that provides visual information regarding a stimulus to the photonic crystal beads selected from the group consisting of an electrical stimulus, an electrostatic stimulus, a magnetic stimulus, an electromagnetic stimulus, an optical stimulus, a pressure stimulus, a temperature stimulus, a biological stimulus, and a chemical stimulus.

18. The system of claim 15, wherein the photonic crystal beads modulate a reflectivity of the system in response to an electric field between the first electrically conductive layer and the second optically transparent, electrically conductive layer.

19. The system of claim 18, wherein the photonic crystal beads are bi-static display beads comprising a plurality of substantially reflective beads and a plurality of substantially light-absorbing beads, one of the plurality of substantially reflective beads and the plurality of substantially light-absorbing beads being configured to move dynamically into the corner cube retroreflective pattern in response to a change in direction of the electric field.

20. The system of claim 15, wherein an incident light on the system is modulated by the photonic crystal beads to produce a modulated light that provides a visual information relating to a sensor stimulus selected from the group consisting of an electrical stimulus, an electrostatic stimulus, a magnetic stimulus, an electromagnetic stimulus, an optical stimulus, a pressure stimulus, a temperature stimulus, a biological stimulus, and a chemical stimulus.

* * * * *